No. 896,062. PATENTED AUG. 11, 1908.
M. H. MANN.
CARD PRINTING MACHINE.
APPLICATION FILED NOV. 29, 1907.

6 SHEETS—SHEET 1.

Witnesses
I. J. McCauley
Wells L. Church

Inventor:
Miles H. Mann
by Bakewell Cornwall
Atty's

No. 896,062. PATENTED AUG. 11, 1908.
M. H. MANN.
CARD PRINTING MACHINE.
APPLICATION FILED NOV. 29, 1907.

6 SHEETS—SHEET 4.

Witnesses
A. J. McCauley
Wells R. Church

Inventor:
Miles H. Mann
by Bakewell Cornwall
Att'ys.

No. 896,062. PATENTED AUG. 11, 1908.
M. H. MANN.
CARD PRINTING MACHINE
APPLICATION FILED NOV. 29, 1907.

6 SHEETS—SHEET 5.

Witnesses
A. J. McCauley.
Wells L. Church.

Inventor:
Miles H. Mann
by Bakewell Cornwall
Atty's.

No. 896,062. PATENTED AUG. 11, 1908.
M. H. MANN.
CARD PRINTING MACHINE.
APPLICATION FILED NOV. 29, 1907.

6 SHEETS—SHEET 6.

Witnesses
A. J. McCauley
Miles L. Church

Inventor:
Miles H. Mann
by Bakewell Cornwall
Atty's.

UNITED STATES PATENT OFFICE.

MILES H. MANN, OF LOUISIANA, MISSOURI.

CARD-PRINTING MACHINE.

No. 896,062.  Specification of Letters Patent.  Patented Aug. 11, 1908.

Application filed November 29, 1907. Serial No. 404,284.

*To all whom it may concern:*

Be it known that I, MILES H. MANN, a citizen of the United States, residing at Louisiana, Missouri, have invented a certain new and useful Improvement in Card-Printing Machines, of which the following is a full, clear, and exact description, such as will enable others skilled in the art to which it appertains to make and use the same, reference being had to the accompanying drawings, forming part of this specification, in which—

Figure 1:
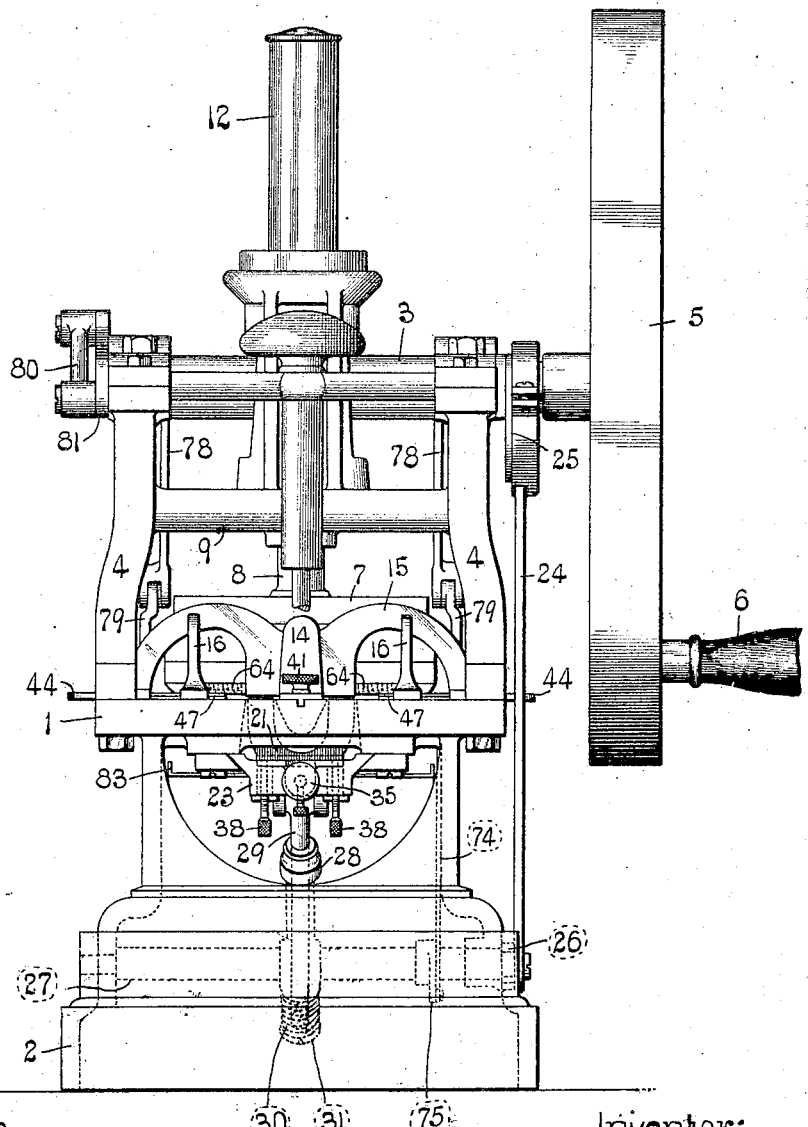
Figure 2:
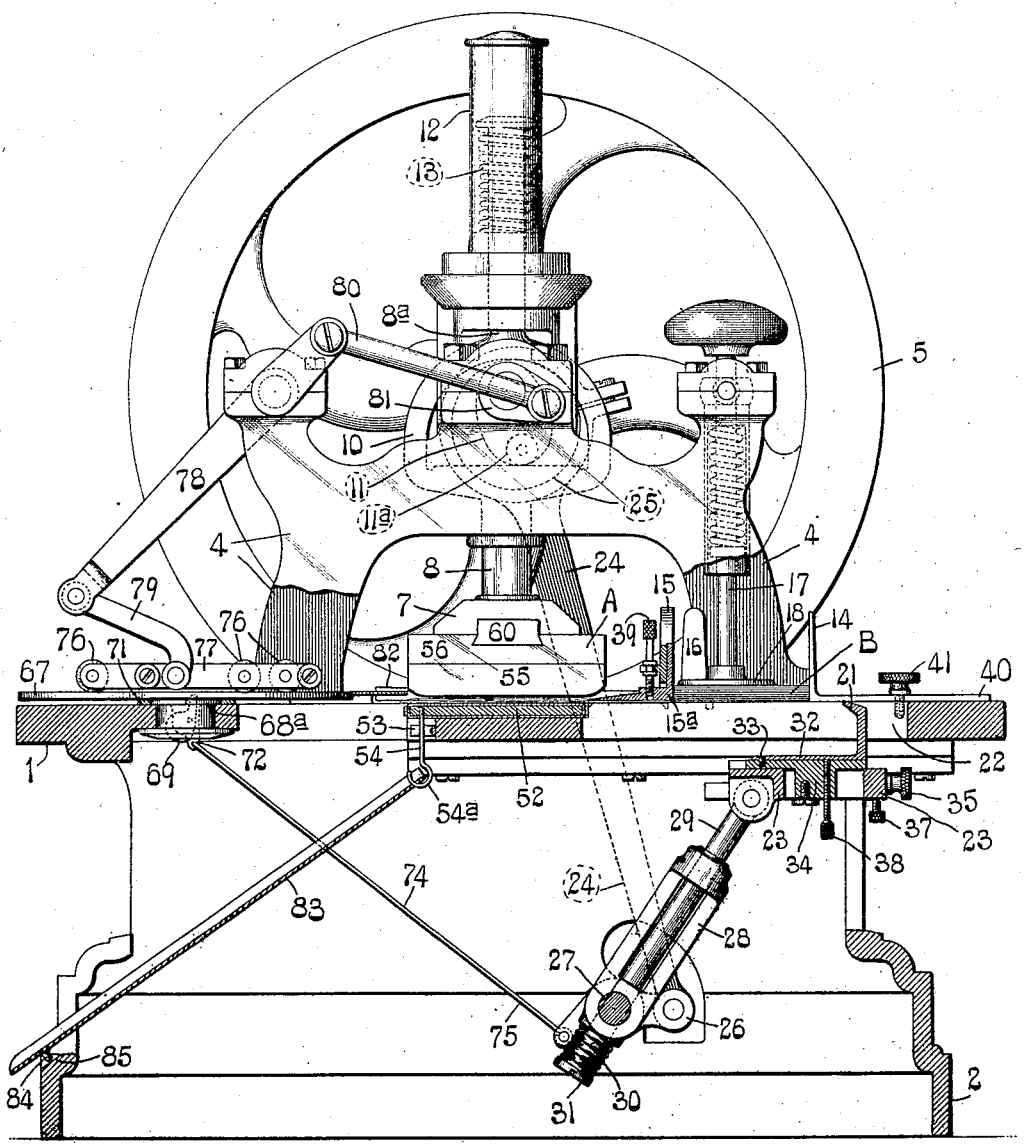
Figure 3:
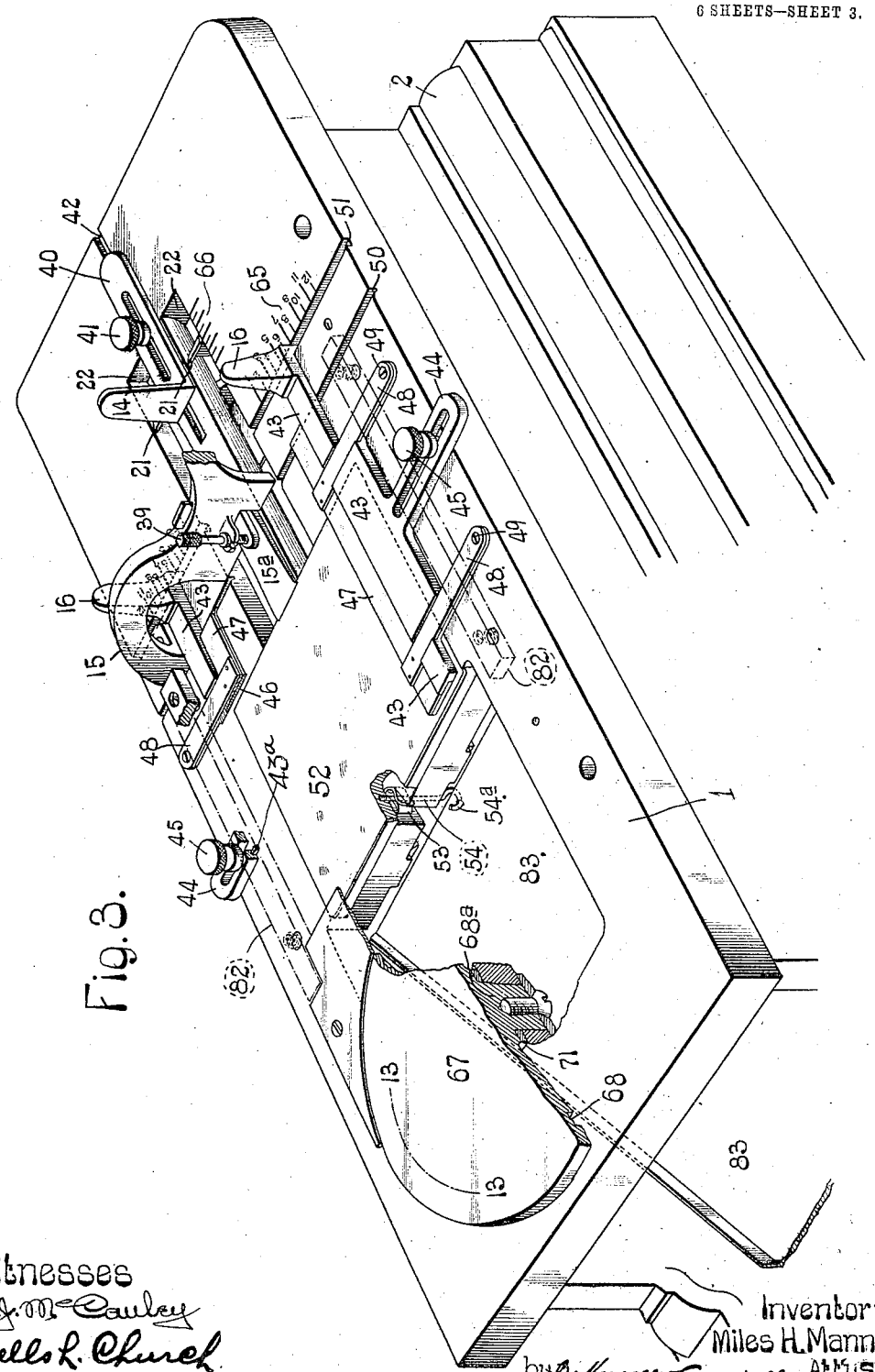
Figure 4:
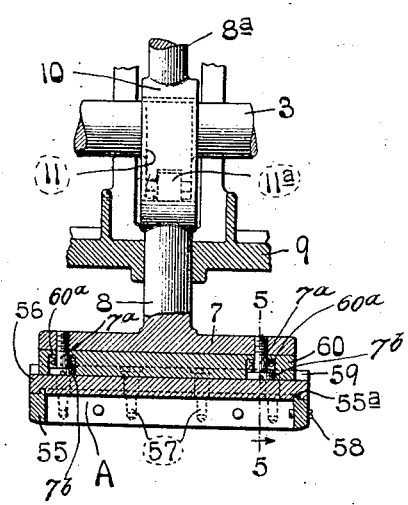
Figure 6:
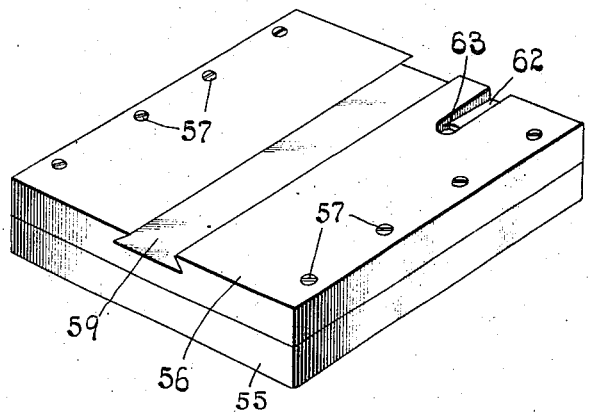
Figure 5:
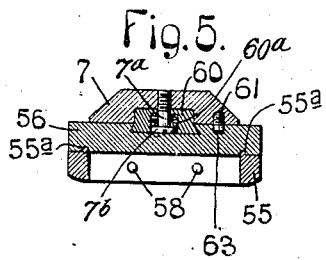
Figure 7:
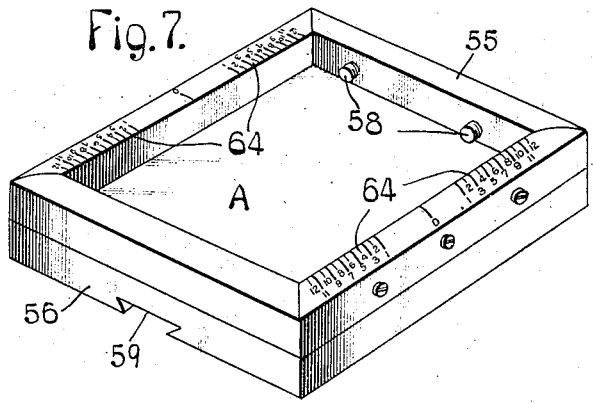
Figure 8:
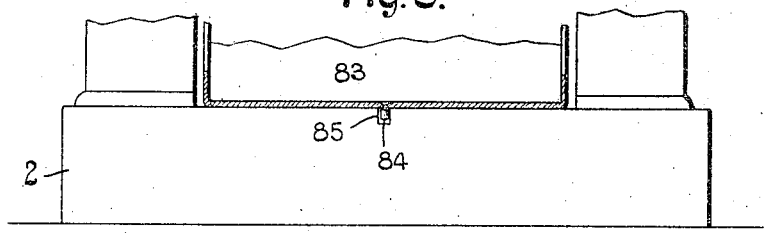
Figure 9:
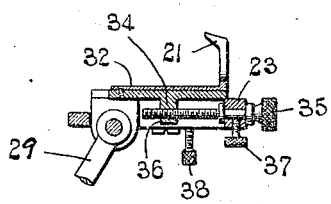
Figure 10:
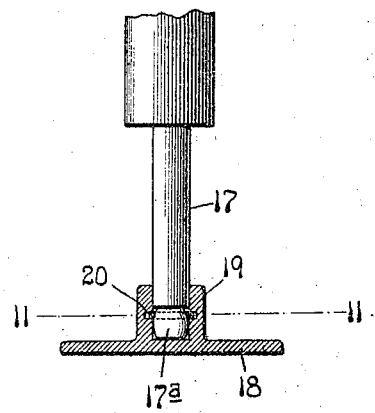
Figure 11:
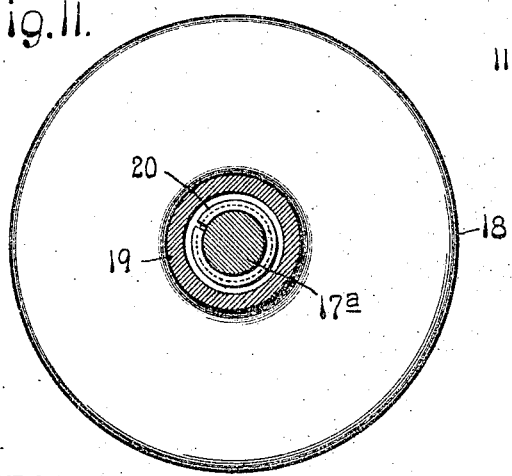
Figure 12:
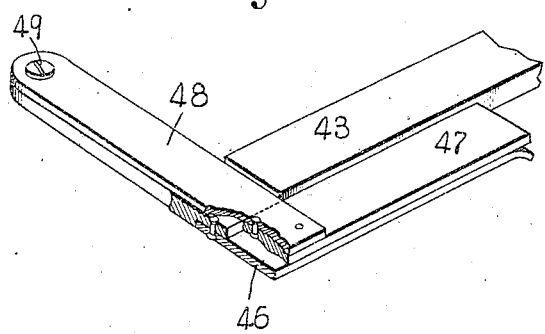
Figure 13:
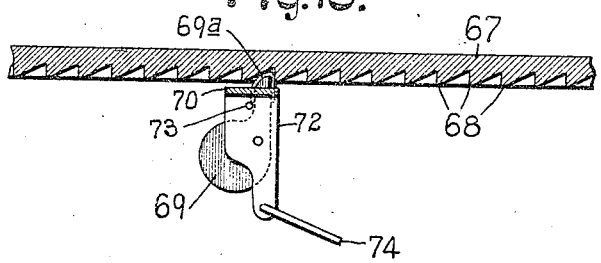
Figure 14:
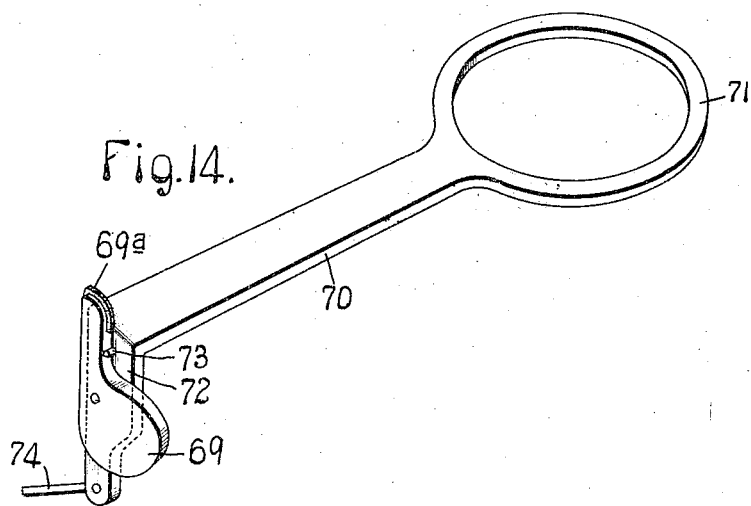

Figure 1 is a front elevation of a machine constructed in accordance with my invention; Fig. 2 is a side elevation partly in longitudinal section of the machine shown in Fig. 1; Fig. 3 is a perspective view of the bed plate and parts mounted thereon, the head of the machine being removed; Fig. 4 is a transverse sectional view showing the plunger which carries the type box; Fig. 5 is a detail sectional view taken on the line 5—5 of Fig. 4; Fig. 6 is a perspective top plan view of the type box; Fig. 7 is a perspective bottom plan view of the type box; Fig. 8 is a rear elevation of a portion of the machine showing the chute down which the printed cards slide as they are discharged from the platen; Fig. 9 is a detail longitudinal sectional view of the carriage which carries the feeding fingers; Fig. 10 is an enlarged view partly in section of the presser or clamp that bears upon the pile of card blanks; Fig. 11 is an enlarged sectional view taken on the line 11—11 of Fig. 10; Fig. 12 is an enlarged detail view of one of the guides which engage the end portions of the card blanks as they are being fed into printing position; Fig. 13 is an enlarged sectional view taken on the line 13—13 of Fig. 3; and Fig. 14 is an enlarged perspective view of the feeding lever for the inking plate.

This invention relates to printing machines, and particularly to machines that are used for printing calling cards, business cards, postal cards, etc.
The main object of my invention is to provide a machine for the purpose described that is of simple construction and which can be manufactured at a small cost.

Another object of my invention is to provide a card-printing machine that will be rapid and positive in operation. And still another object is to provide a machine that can be adjusted quickly to accommodate card blanks of different sizes and which is so con- structed that a perfect arrangement of the printing on the card blanks is insured.

Other desirable features of my improved machine will be hereinafter pointed out.

Referring to the drawings which illustrate the preferred form of my invention, 1 designates the bed plate of the machine which is mounted on the base 2. A rotatable shaft or drive shaft 3 is journaled in standards 4 that project upwardly from the bed plate and said shaft may be operated either manually or by power. I have herein shown the drive shaft as being provided with a fly-wheel 5 to which a handle 6 is secured so that said shaft can be operated manually but it will, of course, be understood that the drive shaft could be provided with a pulley for receiving a driving belt if so desired or a friction pulley could be applied directly to the fly-wheel. The printing type are clamped in a type box A which is secured to a head 7 on the lower end of a plunger 8 that is reciprocatingly mounted in a cross piece 9 connected to the standards 4, said plunger being provided with a yoke 10 that receives a cam 11 on the drive shaft 3, as shown in broken lines in Fig. 2. The portion $8^a$ of the plunger above the yoke 10 is arranged in a tubular-shaped housing 12 that is connected to the cross piece 9, and a coiled expansion spring 13 surrounds the portion $8^a$ of the plunger between a head on the upper end thereof and shoulder on the housing 12, as shown in broken lines in Fig. 2. The cam 11 on the drive shaft operates to force the plunger 8 downwardly to cause the type to make an impression on the card blanks and the expansion spring 13 returns the plunger to its elevated position. I prefer to arrange a roller $11^a$ in the high portion of the cam 11 to reduce the friction between said cam and the yoke 10 on the plunger and also proportion said yoke so that the distance or space between the top and bottom sides thereof is equal to the greatest diameter of the cam 11, thereby preventing the cam from pounding on the yoke as it revolves.

The card blanks B that are to be printed are arranged between a front and rear guide 14 and 15, respectively, and two side guides 16 mounted on the bed plate, the pile of card blanks being clamped together, as shown in Fig. 2, by means of a pressing device that consists of a spring-actuated plunger 17 provided at its lower end with a foot piece 18. I prefer to detachably connect the foot piece 18 to the plunger 17 so that foot pieces of different dimensions can be used, thus enabling the device to firmly clamp large or small card blanks.

In Figs. 10 and 11 I have shown in detail the way in which the foot piece 18 is secured to the plunger 17, the foot-piece being provided with a collar 19 having a split spring ring 20 arranged on the interior thereof, and the plunger being provided with an approximately ball-shaped head $17^a$ which the split ring engages when the collar is forced onto the lower end of the plunger. This forms a very simple and efficient locking means for the foot piece and also enables the foot piece to be readily detached and arranged in position without manipulating any set screws or clamping nuts.

The mechanism for feeding the card blanks into operative position underneath the type box consists of a pair of fingers 21 projecting upwardly through elongated slots 22 in the bed plate and carried by a sliding carriage 23 which is reciprocatingly mounted in stationary guideways, the upper ends of the fingers 21 extending slightly above the top surface of the bed plate so as to remove the bottom card blank from the pile as the carriage 23 moves towards the rear of the machine. Reciprocating movement is imparted to the carriage 23 by means of a link 24 provided at its upper end with a strap which surrounds an eccentric 25 on the drive shaft 3 and having its lower end secured to an arm 26 on a rock shaft 27 provided with a hollow arm or guideway 28 that receives a rod 29 which is secured to the carriage 23, as shown in Fig. 2. The rod 29 passes loosely through the hollow arm or guideway 28, and a coiled expansion spring 30 is interposed between the lower end of said guideway and a headed screw 31 adjustably mounted in the lower end of the rod 29. An actuating mechanism of this construction moves the carriage 23 positively in both directions and overcomes the necessity of having any lost motion between the carriage and its actuating arm to provide for the rotary path of movement of the arm.

For enabling the feeding fingers 21 to be adjusted longitudinally of the carriage 23 so as to vary the distance which the card blanks are fed rearwardly I have mounted said fingers on a spring plate 32 that is connected at one end by means of fastening devices 33 to a block 34 which is adjustably mounted in the carriage 23, as shown in Figs. 2 and 9. The block 34 is moved longitudinally of the carriage by means of an adjusting screw 35 journaled in the carriage and passing through a screw-threaded opening in a lug 36 on the underneath side of the block, and a set screw 37 is provided for locking the screw 35 so as to hold the fingers 21 in adjusted position. The feeding fingers can also be adjusted vertically relatively to the carriage to vary the distance which they project above the top surface of the bed plate by means of an adjusting screw 38 mounted in the block 34 and bearing against the underneath side of the spring plate 32 on which the feeding fingers are mounted.

The rear guide 15 is positively connected to the bed plate 1 but said guide is provided with an adjustable portion $15^a$ which is spaced away from the top surface of the bed plate a distance equal to the thickness of one of the card blanks so that the bottom card blank of the pile can be moved under the guide 15 by the feeding fingers 21 as they move rearwardly. The object of providing the guide 15 with an adjustable portion $15^a$ is to enable the slot or space between the guide 15 and the bed plate to be varied to accommodate card blanks of different thicknesses, the portion $15^a$ being moved or adjusted vertically by means of a screw 39 journaled in lugs on the rear side of the guide 15 and entering a screw-threaded opening in the movable portion $15^a$ of said guide, as shown in Fig. 2. The front guide 14 is provided with a slotted shank 40 through which a set screw 41 passes so that said guide can be adjusted relatively to the rear guide 15, and on the underneath side of the shank 40 is a lug which fits in a groove 42 in the top surface of the bed plate to prevent said front guide from turning or moving laterally.

Each of the side guides 16 is carried by a plate 43 which is provided with a slotted arm 44 that receives a clamping screw 45 on the bed plate, as shown in Fig. 3, thereby enabling the side guides to be moved toward and away from each other to accommodate card blanks of different lengths. The plates 43 are provided with yielding guides for receiving the end portions of the card blanks as they are being fed into printing position, the yielding guide on each plate consisting of a metal strip 46 secured to the underneath side of the plate and projecting beyond the inner edge thereof and a superimposed metal strip 47 carried by spring arms 48 that are connected at their outer ends by fastening devices 49 to laterally projecting arms on the plate 43, as shown clearly in Fig. 12. The front end of each of the strips 46 is bent downwardly so that it will enter a transversely extending groove 50 in the top surface of the bed plate, as shown in Fig. 3, to prevent the card blanks from catching or sticking as they start to enter the yielding guides. I also prefer to provide the side guides 16 with downwardly extending ribs that enter a transversely extending slot 51 in the bed plate so as to prevent thin card blanks from slipping endwise under the guides 16. To prevent the guides from shifting or moving in any direction other than transversely of the bed plate I have provided the bed plate with a rib 43ª that fits in a slot on the underneath side of the plate 43 and arm 44 thereon, as shown in Fig. 3.

The platen 52 on which the card blanks rest during the printing operation is detachably connected to the bed plate by means of a spring jaw 53 that receives a shank or projection 54 on the underneath side of the platen, the jaw 53 herein shown consisting of a piece of spring metal that is bent into approximately U-shape with the legs of the U bent inwardly intermediate their ends.

The type box A is shown in detail in Figs. 4 to 7, and consists of a rectangular-shaped frame 55 provided on its upper side with a continuous flange 55ª that enters a groove on the underneath side of a plate 56, and said plate and frame are secured together by screws or other suitable fastening devices 57. This produces a very strong and rigid construction and positively prevents the frame 55 from shifting relatively to the plate 56. The type are clamped inside of the frame 55 by means of set screws 58, and the plate 56 is provided on its upper side with a dovetailed groove 59 that receives a yieldingly mounted dovetailed rib 60 on the underneath side of the head 7 on the lower end of the reciprocating plunger 8. The head 7 is provided on its underneath side with projections 7ª that pass through openings in the rib 60, and coiled expansion springs 60ª are interposed between heads 7ᵇ on said projections and the bottoms of recesses in the rib 60, as shown in Figs. 4 and 5. The springs 60ª force the rib 60 upwardly toward the head 7 and thus hold the plate 56 of the type carrier firmly against the underneath side of said head. Said head 7 is provided with a pin 61, as shown in Fig. 5, and the plate 56 of the type box is provided on its upper side with a slot 62 that terminates in a hole or recess 63 of greater depth than the slot for receiving the pin 61 when the type box is forced onto the rib 60 on the head 7, thereby preventing the type box from becoming accidentally shifted after it has been arranged in position.

As shown in Fig. 7, the frame 55 of the type box is provided with graduations 64, and the bed plate is provided with corresponding graduations 65 for the side guides 16 so that the operator can examine the type after they have been clamped in the type box and see how the type are positioned relatively to the graduations 64 and then adjust the side guides 16 so that the card blanks will occupy such a position relatively to the type that the printing will be arranged at an equal distance from each end of the card blank. Graduations 66 are also arranged on the bed plate along the slots 22, as shown in Fig. 3, so that the operator can tell just how the feeding fingers 21 should be positioned on the carriage 23 to cause the printing to be arranged at an equal distance from the top and bottom edges of the card blank.

To position the fingers 21, the operator first feeds a card blank through the machine and if the printing on said card is arranged too close to the upper edge of the card he turns the screw 35 so as to move the feeding fingers rearwardly relatively to the carriage 23 so that the card blank will be fed rearwardly a greater distance and thus cause the printing to be arranged at the same distance from the upper and lower edges of the card. If the printing on the test card blank is arranged too close to the lower edge of the blank he turns the screw 35 so as to move the feeding fingers forwardly and thus cut down the distance which they feed the card blanks rearwardly.

An inking plate 67 is rotatably mounted on the bed plate 1 at the rear of the platen 52, as shown in Figs. 2 and 3, and on the underneath side of said plate is a circular row of ratchet teeth 68 with which a weighted pawl 69 on an oscillating lever 70 coöperates, said row of teeth being concentric to the axis of the inking plate. The lever 70 is provided at its inner end with a collar 71 that surrounds a cylindrical boss 68ª on the underneath side of the inking plate, and the pawl 69 is pivotally connected to a downwardly projecting portion 72 on the outer end of the lever 70, said portion 72 being provided with a pin 73 which forms a stop for the pawl. Movement is imparted to the lever 70 by a link 74 that is fastened to an arm 75 on the rock shaft 27 and as the pawl on said lever moves in a rotary path that is concentric with the axis of the inking plate, said plate will be fed positively and accurately with a step-by-step movement. Preferably, the tooth of the pawl 69 is split and a piece of leather, rubber, fiber or other non-metallic material 69ª is inserted therein so as to prevent the pawl from making a noise as it moves rearwardly over the ratchet teeth preparatory to feeding the inking plate forwardly. If desired, the inking plate can be provided on its underneath side with a circular piece of cloth or soft rubber so as to deaden any ringing sound caused by the movement of pawl 69.

The ink is applied to the face of the type in the type box by means of rollers 76 mounted in a reciprocating carriage 77 which is actuated by a rock lever 78 having its lower end connected by a link 79 to said carriage, and its upper end connected by a link 80 to an arm 81 on the drive shaft 3. As said drive shaft revolves the lever 78 will be rocked to move the carriage 77 over the inking plate and then underneath the type box, the rollers in said carriage becoming coated with the ink which is placed on the inking plate so that they will apply the ink to the type as the carriage 77 moves underneath the type box, the rollers traveling on yielding tracks 82 as they pass underneath the type box, which tracks are shown in Fig. 2 and in broken lines in Fig. 3.

The machine is provided with a chute 83 down which the cards slide after they have been printed, said chute being arranged at the rear of the platen 52, as shown in Fig. 2. This chute preferably consists of a piece of sheet metal provided with side flanges and having an opening at its upper end which receives a hook 54ª on the lower end of the projection or shank 54 on the underneath side of the platen. At the lower end of the chute is a lug or projection 84 that enters a notch 85 in the base of the machine for preventing lateral movement of the chute. This forms a very simple and efficient means for holding the chute in position and enables the chute to be removed quickly.

Having thus described my invention, what I claim as new and desire to secure by Letters Patent is:

1. A machine of the character described, comprising a plunger provided at its lower end with a head, a dovetailed rib arranged on the underneath side of said head, springs for forcing said rib upwardly toward said head, a pin in said head, and a type box provided with a dovetailed groove for receiving the rib on the head, and a hole or recess for receiving said pin; substantially as described.

2. A machine of the character described, comprising a reciprocating plunger provided at its lower end with a head, a type box detachably connected to said head, said type box consisting of a plate provided on its underneath side with a continuous groove, a frame provided with a continuous flange that fits in said groove, and screws passing through said plate into said frame for securing the frame and plate together; substantially as described.

3. A machine of the character described, provided with a bed plate, a horizontal platen mounted on said bed plate and provided on its underneath side with a downwardly extending shank or projection, a yielding jaw for engaging said projection to retain the platen in position, and an inclined chute provided at its upper end with an opening that receives a hook on the lower end of said shank; substantially as described.

4. A machine of the character described, provided with a bed plate, a platen mounted on said bed plate and provided with a downwardly extending projection or shank, and an approximately U-shaped jaw formed of spring material for embracing said projection to retain the platen in position; substantially as described.

5. In a machine of the character described, a plunger carrying a type-box which consists of a plate provided on its underneath side with grooves that extend parallel to the sides and ends of said plate, a frame connected to said plate by fastening devices, and means projecting into the grooves in said plate for preventing the frame from moving laterally relatively to the plate; substantially as described.

6. In a machine of the character described, a reciprocating plunger provided at its lower end with a type-box, means on said type-box for clamping type therein, graduations on said type-box which can be examined to determine the location of the type in the type-box, a bed plate, adjustable side guides on said bed plate for positioning a pile of card-blanks, and graduations on the bed plate coöperating with the graduations on the type-box for enabling the operator to set the side guides in such a position that the type in the type-box will print at the proper place on the card-blanks; substantially as described.

In testimony whereof I hereunto affix my signature in the presence of two witnesses, this 22nd day of November, 1907.

MILES H. MANN.

Witnesses:
P. NEERUP,
LEWIS FRIER.